US011928294B2

United States Patent
Zhou et al.

(10) Patent No.: US 11,928,294 B2
(45) Date of Patent: Mar. 12, 2024

(54) BONDING METHOD OF TOUCH-CONTROL DISPLAY PANEL, TOUCH-CONTROL DISPLAY PANEL AND ELECTRONIC DEVICE

(71) Applicant: Anhui Hongcheng Opto-Electronics Co., Ltd., Anhui (CN)

(72) Inventors: Hui Zhou, Anhui (CN); Peiqi Zhang, Anhui (CN); Nana Ren, Anhui (CN)

(73) Assignee: Anhui Hongcheng Opto-Electronics Co., Ltd., Bengbu (CN)

( * ) Notice: Subject to any disclaimer, the term of this patent is extended or adjusted under 35 U.S.C. 154(b) by 0 days.

(21) Appl. No.: 18/033,368

(22) PCT Filed: Dec. 16, 2020

(86) PCT No.: PCT/CN2020/136944
§ 371 (c)(1),
(2) Date: Apr. 24, 2023

(87) PCT Pub. No.: WO2022/088431
PCT Pub. Date: May 5, 2022

(65) Prior Publication Data
US 2023/0418419 A1  Dec. 28, 2023

(30) Foreign Application Priority Data
Oct. 30, 2020 (CN) .......................... 202011192512.4

(51) Int. Cl.
*G06F 3/045* (2006.01)
*B32B 3/26* (2006.01)
(Continued)

(52) U.S. Cl.
CPC .............. *G06F 3/044* (2013.01); *B32B 3/266* (2013.01); *B32B 7/12* (2013.01); *B32B 17/06* (2013.01);
(Continued)

(58) Field of Classification Search
CPC .... G06F 1/1637; G06F 1/1641; G06F 3/0412; G06F 3/044; G06F 2203/04103
(Continued)

(56) References Cited

U.S. PATENT DOCUMENTS 11,531,228 B2 * 12/2022 Zeng ................. G02F 1/133512
2009/0162645 A1 * 6/2009 Matsuhira ............. G02F 1/1333
428/332
(Continued)

FOREIGN PATENT DOCUMENTS

CN  102529295 A  7/2012
CN  202615360 U  12/2012
(Continued)

OTHER PUBLICATIONS

The First Office Action for Chinese Application No. 202011192512.4, dated Nov. 1, 2021, 16 pages.
(Continued)

*Primary Examiner* — Joe H Cheng
(74) *Attorney, Agent, or Firm* — East IP P.C.

(57) ABSTRACT

A bonding method of a touch-control display panel, a touch-control display panel and an electronic device are provided. The bonding method includes: fixing a glass cover plate, and adhering a first adhesive on the glass cover plate in a circumferential direction of a non-display area of the glass cover plate; stretching a capacitive film to make it flat, aligning and bonding the capacitive film with the glass cover plate to adhesive the capacitive film and the glass cover plate by the first adhesive; at a side of the capacitive film facing away from the glass cover plate, adhering a second adhesive on the capacitive film in the circumferential direction corresponding to the non-display area; and aligning and bonding a display screen with the capacitive film to adhesive the
(Continued)

display screen and the capacitive film by the second adhesive. At least the first adhesive is a double-sided adhesive.

17 Claims, 2 Drawing Sheets

(51) Int. Cl.
    *B32B 7/12*       (2006.01)
    *B32B 17/06*     (2006.01)
    *B32B 37/10*     (2006.01)
    *B32B 37/12*     (2006.01)
    *B32B 38/00*     (2006.01)
    *G06F 3/044*     (2006.01)

(52) U.S. Cl.
    CPC ............ *B32B 37/10* (2013.01); *B32B 37/12* (2013.01); *B32B 38/0004* (2013.01); *B32B 38/0012* (2013.01); *B32B 2038/0028* (2013.01); *B32B 2307/20* (2013.01); *B32B 2307/7376* (2023.05); *B32B 2315/08* (2013.01); *B32B 2457/208* (2013.01); *G06F 2203/04103* (2013.01)

(58) Field of Classification Search
    CPC .......... B32B 3/266; B32B 7/12; B32B 37/12; B32B 2038/0028; B32B 2457/208
    See application file for complete search history.

(56) References Cited

U.S. PATENT DOCUMENTS

| | | |
|---|---|---|
| 2011/0234526 A1 | 9/2011 | Mi |
| 2016/0098109 A1 | 4/2016 | Choi et al. |
| 2021/0333902 A1* | 10/2021 | Zhou .................. B32B 37/1292 |
| 2021/0365131 A1* | 11/2021 | Zhou .................... G06F 1/1637 |

FOREIGN PATENT DOCUMENTS

| | | | | |
|---|---|---|---|---|
| CN | 103336603 | A | | 10/2013 |
| CN | 204302952 | U | * | 4/2015 |
| CN | 204302952 | U | | 4/2015 |
| CN | 105208147 | A | | 12/2015 |
| CN | 206039483 | U | * | 3/2017 |
| CN | 107741798 | A | * | 2/2018 .......... G06F 3/0412 |
| CN | 208521269 | U | | 2/2019 |
| CN | 109445644 | A | | 3/2019 |
| CN | 208753324 | U | | 4/2019 |
| CN | 109861681 | A | | 6/2019 |
| CN | 110549593 | A | | 12/2019 |
| CN | 110837315 | A | | 2/2020 |
| CN | 110851012 | A | | 2/2020 |
| CN | 210038754 | U | * | 2/2020 |
| JP | 3192251 | U | | 8/2014 |

OTHER PUBLICATIONS

The Grant Notification for Chinese Application No. 202011192512.4, dated Mar. 15, 2022, 6 pages.

The International search report for PCT Application No. PCT/CN2020/136944, dated May 26, 2021, 4 pages.

* cited by examiner

BONDING METHOD OF TOUCH-CONTROL DISPLAY PANEL, TOUCH-CONTROL DISPLAY PANEL AND ELECTRONIC DEVICE

CROSS REFERENCE TO RELATED APPLICATION

This application is a national phase of PCT Application No. PCT/CN2020/136944, which is filed on Dec. 16, 2020 and claims priority to Chinese Patent Application No. 202011192512.4, titled "BONDING METHOD OF TOUCH-CONTROL DISPLAY PANEL, TOUCH-CONTROL DISPLAY PANEL AND ELECTRONIC DEVICE" and filed on Oct. 30, 2020, both of which are hereby incorporated by reference in their entireties.

TECHNICAL FIELD

The present application relates to the technical field of display, and in particular to a bonding method of a touch-control display panel, a touch-control display panel and an electronic device.

BACKGROUND

As display products, especially large-size display products, are more and more widely used in education and business fields, in the manufacture of the display products, it is necessary to bond a glass cover plate, a capacitive film and a display screen to one another. In the prior art, a piece of OCA glue (Optically Clear Adhesive, optical glue) is attached on an entire surface of the capacitive film facing away from the display screen, and then the surface attached with the OCA glue is bonded to a tempered glass. After adhering the capacitive film and tempered glass, air bubbles often appear between the capacitive film and tempered glass. They need to be rolled and pressed repeatedly by a tool, and after rolling, the air bubbles must be removed through a defoaming machine, so as to achieve the better bonding effect.

However, the defoaming machine cannot 100% discharge the air bubbles between the capacitive film and the tempered glass. Because the thickness of the OCA glue is very thin during the bonding process (0.125 mm thickness is commonly used), therefore more air bubbles will be generated, and it is more difficult to clean them completely during the defoaming process, resulting in a low yield rate of a touch-control display panel. During the rolling process, the problems such as unevenness of the capacitive film may be caused, so that it may affect the quality of the touch-control display panel. In addition, the OCA glue is relatively expensive, so that it will undoubtedly increase the manufacturing cost of the touch-control display panel. Furthermore, if the touch-control display panel formed by the above method on the market has a problem and needs to be repaired, when reworking, due to the strong adhesive force of OCA glue, it needs to be disassembled at low temperature. At the low temperatures, the structure of the capacitive film may be directly cracked, the capacitive film may be directly scrapped and cannot be reused, and the entire touch-control display panel needs to be replaced, so that it may increase the maintenance cost.

SUMMARY

Based on the above-mentioned present situation, the main object of the present application is to provide a bonding method of a touch-control display panel, a touch-control display panel, and an electronic device, so as to solve the problems that the bubbles in the touch-control display panel cannot be completely removed and the touch-control display panel cannot be repaired in the prior art.

In order to achieve the above object, the technical solutions of the present application are as follows:

In a first aspect, the present application provides a bonding method of a touch-control display panel. The touch-control display panel includes a glass cover plate, a capacitive film and a display screen. The bonding method includes:
  a primary adhesive-applying step: fixing the glass cover plate, and adhering a first adhesive on the glass cover plate in a circumferential direction of a non-display area of the glass cover plate;
  a capacitive film bonding step: stretching the capacitive film to make it flat, aligning and bonding the capacitive film with the glass cover plate to adhesive the capacitive film and the glass cover plate by the first adhesive;
  a secondary adhesive-applying step: at a side of the capacitive film facing away from the glass cover plate, adhering a second adhesive on the capacitive film in the circumferential direction corresponding to the non-display area; and
  a display screen bonding step: aligning and bonding the display screen with the capacitive film to adhesive the display screen and the capacitive film by the second adhesive, thereby forming air gaps between the glass cover plate and the capacitive film and between the capacitive film and the display screen respectively in an area corresponding to a display area of the glass cover plate; at least the first adhesive is a double-sided adhesive.

Optionally, between the capacitive film bonding step and the secondary adhesive-applying step, the bonding method further includes:
  a pressing step: pressing the capacitive film and the glass cover plate to adhere the capacitive film and the glass cover plate firmly.

Optionally, the pressing step specifically includes:
  placing a pressing plate on the side of the capacitive film facing away from the glass cover plate, in which the pressing plate is frame-shaped, the pressing plate corresponds to the non-display area, thereby applying a pressure to the capacitive film and the glass cover plate, so that the capacitive film and the glass cover plate closely adhere with the first adhesive.

Optionally, in the primary adhesive-applying step, the first adhesive is discontinuously arranged in the circumferential direction of the non-display area.

Optionally, the second adhesive is a double-sided adhesive, and in the secondary adhesive-applying step, the second adhesive is arranged in a ring shape.

Optionally, before the capacitive film bonding step, the bonding method further includes: a hole-forming step: forming a through hole on a portion of the capacitive film corresponding to the non-display area, so that the first adhesive and the second adhesive are enabled to be adhered with each other through the through hole in subsequent steps.

In a second aspect, the present application provides a touch-control display panel including: a glass cover plate, a capacitive film and a display screen arranged in sequence. A through hole is formed on an area of the capacitive film corresponding to a non-display area of the glass cover plate; the touch-control display panel further includes a first adhesive and a second adhesive; the first adhesive is arranged between the glass cover plate and the capacitive film; and the second adhesive is arranged between the capacitive film and the display screen; each of the first adhesive and the second adhesive are arranged in a circumferential direction of the non-display area of the glass cover plate; the first adhesive and the second adhesive are adhered to each other through the through hole, so that air layers are formed between the glass cover plate and the capacitive film and between the capacitive film and the display screen respectively in an area corresponding to a display area of the glass cover plate; at least the first adhesive is a double-sided adhesive.

Optionally, the first adhesive is discontinuously arranged in the circumferential direction of the non-display area; the second adhesive is arranged in a ring shape.

Optionally, the second adhesive is a double-sided adhesive; a thickness of the first adhesive is 0.5 mm-3 mm; a thickness of the second adhesive is 1 mm-5 mm.

In a third aspect, the present application provides an electronic device including the touch-control display panel as described above.

Optionally, the electronic device is an interactive display screen, an interactive smart panel or a flat panel TV.

According to the bonding method of the present application, in a first aspect, the glass cover plate, the capacitive film and the display screen can be bonded among one another directly through the adhesive, so that it can eliminate an OCA layer. Thus, there will be no bubbles between the glass cover plate and the capacitive film after bonding, and the rolling and defoaming processes are not required. Therefore, not only can the subsequent defoaming process be saved, but also the yield rate of the touch-control display panel can be improved. In addition, since the first adhesive is the double-sided adhesive which cannot flow, when the capacitive film is adhered with the first adhesive, it can still ensure that the capacitive film is in a flat state, so as to avoid the possible wrinkles of the capacitive film during the rolling process. Therefore, the flatness of the capacitive film of the touch-control display panel manufactured by this method can be relatively high, and the yield rate of the touch-control display panel can be further improved. Since the first adhesive and the second adhesive are arranged in the area corresponding to the non-display area, the adhesives do not need to be the optical adhesives, and an ordinary adhesive, such as a non-light-transmitting adhesive, can be used, so that the manufacturing cost of the touch-control display panel can also be reduced. In a second aspect, according to the bonding method, even if the product on the market need to be repaired, during reworking, the surrounding adhesive can be cleaned directly in a normal temperature environment, instead of a low temperature environment. The structure of the capacitive film is not easily damaged during the process of cleaning the adhesive. Therefore, the touch-control display panel manufactured by the bonding method of the present application can also be reworked and repaired, thereby reducing the maintenance cost of the product.

Other beneficial effects of the present application will be explained in the detail embodiments through the introduction of specific technical features and technical solutions. According to the introduction of these technical features and technical solutions, those skilled in the art should be able to understand the beneficial technical effects brought about by the technical features and technical solutions.

BRIEF DESCRIPTION OF THE DRAWINGS

Optional embodiments provided by the present application will be described below with reference to the drawings. In the drawings.

REFERENCE NUMERALS

10—cover plate; 20—capacitive film; 21—through hole; 30—display screen; 40—first adhesive; 50—second adhesive.

DETAILED DESCRIPTION

The present application will be described below based on examples, but the present application is not limited only to these examples. In the following detailed description of the present application, some specific details are described in detail, and in order to avoid obscuring the essence of the present application, the known methods, procedures, processes, and components are not described in detail.

Additionally, those of ordinary skill in the art should understand that the drawings provided herein are for illustrative purposes and are not necessarily drawn to scale.

Unless the context clearly requires, "include", "comprise" and other similar words in the entire description and claims shall be interpreted as an inclusive meaning rather than an exclusive or exhaustive meaning. In other words, it means "including but not limited to".

In the description of the present application, it should be understood that the terms "first", "second" and the like are used for descriptive purposes only, and should not be understood as indicating or implying relative importance. In addition, in the description of the present application, unless otherwise specified, "plurality" means two or more.

Figure 2:
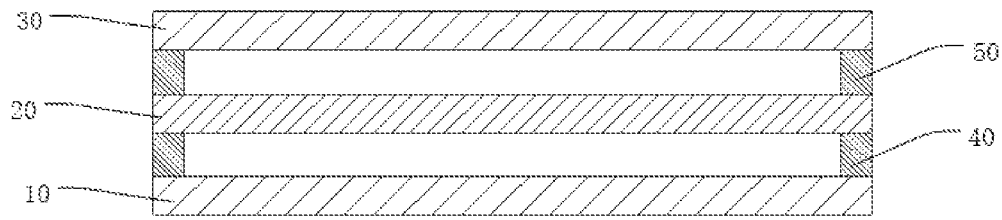
FIG. 2 shows a cross-sectional view of an optional embodiment of a touch-control display panel provided by the present application.
Figure 3:
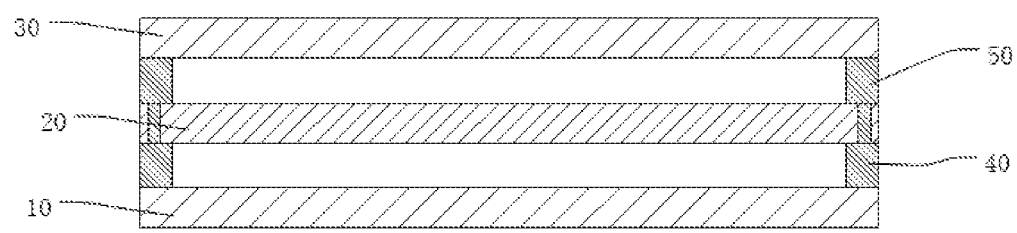
FIG. 3 shows a cross-sectional view of another optional embodiment of a touch-control display panel provided by the present application.
Figure 4:
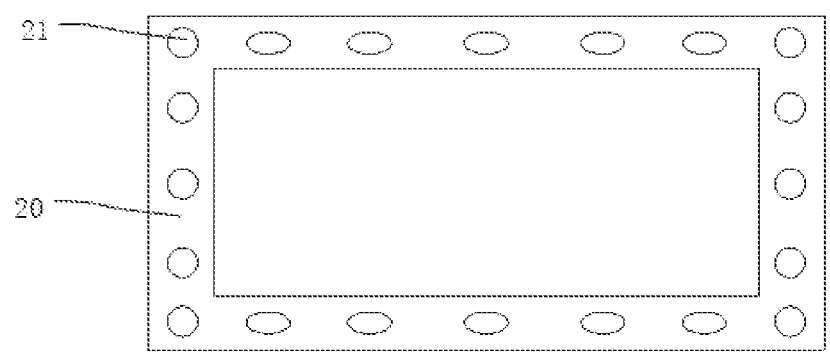
FIG. 4 shows a schematic structural view of an optional embodiment of a capacitive film in a touch-control display panel provided by the present application.

The present application provides a bonding method of a touch-control display panel. As shown in FIGS. 2-4, the touch-control display panel includes a glass cover plate 10, a capacitive film 20 and a display screen 30. The glass cover plate 10 may be a toughened glass plate. The glass cover plate 10 has a display area and a non-display area, and the non-display area can be arranged around the display area in a ring shape. The non-display area can be arranged as a black masked area. Those skilled in the art often refer to the non-display area as black border. The display area and the non-display area of the glass cover plate 10 respectively correspond to a display area and a non-display area of the touch-control display panel which is formed. The display screen 30 may be a liquid crystal display screen. The whole touch-control display panel can be a rectangular structure. Correspondingly, the glass cover plate 10 and the display screen 30 are also rectangular plates, and the capacitive film 20 may be a rectangular film.

Figure 1:
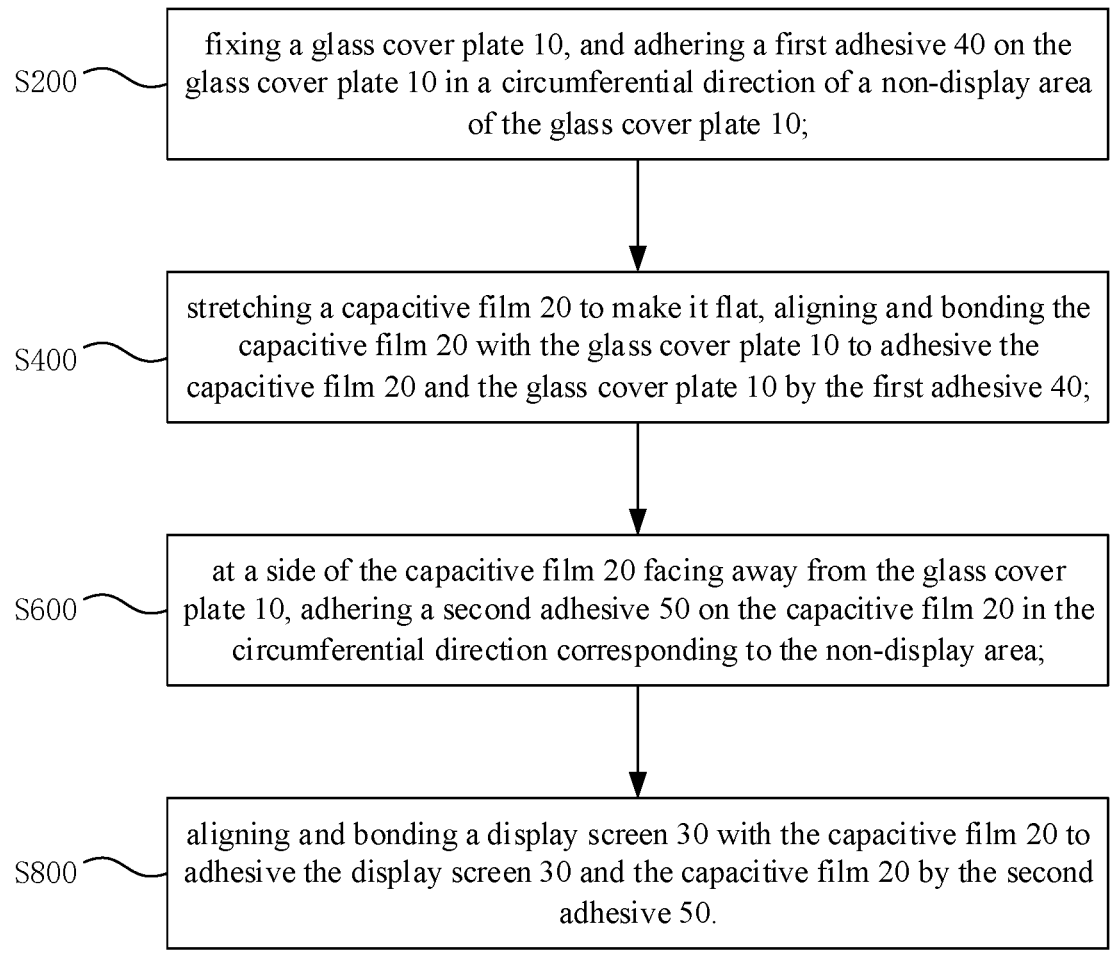
FIG. 1 shows a flow chart of an optional embodiment of a bonding method provided by the present application.

FIG. 1 shows a flow chart of an optional embodiment of the bonding method of the touch-control display panel provided by the present application. As shown in FIG. 1, the bonding method of the touch-control display panel includes:

S200: a primary adhesive-applying step: fixing the glass cover plate 10, and adhering a first adhesive 40 on the glass cover plate 10 in a circumferential direction of a non-display area of the glass cover plate 10.

Specifically, the glass cover plate 10 can be placed on a tooling table. The glass cover plate 10 can be fixed by a positioning block on the tooling table to prevent it from moving during the entire bonding process. For example, in the embodiment where the glass cover plate 10 is the rectangular plate, corner positions of the glass cover plate 10 can be positioned by L-shaped positioning blocks, or the corner positions and edges of the glass cover plate 10 can be positioned by the L-shaped positioning blocks and line-shaped positioning blocks respectively at the same time, so as to fix the glass cover plate 10 better. After the glass cover plate 10 is fixed, the first adhesive 40 can be adhered on its black border.

The bonding method of the touch-control display panel further includes:

S400: a capacitive film bonding step: stretching the capacitive film 20 to make it flat, aligning and bonding the capacitive film 20 with the glass cover plate 10 to adhesive the capacitive film 20 and the glass cover plate 10 by the first adhesive 40.

Specifically, a stretching device can be used to apply a stretching force to each of edges of the capacitive film 20. For example, in the embodiment where the capacitive film 20 is a rectangular film, the stretching forces can be applied to the four edges respectively to keep the capacitive film 20 flat. The capacitive film 20 can be aligned and bonded to the glass cover plate 10 in a state where the capacitive film 20 is kept flat by the stretching device. At this time, the capacitive film 20 is basically fixed on the glass cover plate 10 by the first adhesive 40. Specifically, the parameters of the stretching force need to be selected according to the characteristics such as the thickness and the material of the capacitive film 20.

The bonding method of the touch-control display panel further includes:

S600: a secondary adhesive-applying step: at a side of the capacitive film 20 facing away from the glass cover plate 10, adhering a second adhesive 50 on the capacitive film 20 in the circumferential direction corresponding to the non-display area. That is, the second adhesive 50 is adhered on the capacitive film 20 for adhering with the display screen 30.

S800: a display screen bonding step: aligning and bonding the display screen 30 with the capacitive film 20 to adhesive the display screen 30 and the capacitive film 20 by the second adhesive 50. When the display screen 30 is placed on the capacitive film 20, under the action of gravity, the capacitive film 20 will still be pressed by the glass cover plate 10 and the display screen 30, so that the display screen 30, the capacitive film 20 and the glass cover plate 10 can be adhered more firmly through the first adhesive 40 and the second adhesive 50 to form the touch-control display panel. As shown in FIG. 2, on an area corresponding to the display area of the glass cover plate 10, air gaps can be formed between the glass cover plate and the capacitive film and between the capacitive film and the display screen respectively.

At least the first adhesive 40 is a double-sided adhesive, that is, the first adhesive 40 may be a solid adhesive.

In the above bonding method, in a first aspect, the glass cover plate 10, the capacitive film 20 and the display screen 30 are attached among one another directly through the adhesive (including the first adhesive 40 and the second adhesive 50), so that the OCA adhesive layer can be omitted. Thus, there is no air bubble generated between the glass cover plate 10 and the capacitive film 20 after bonding, so that a defoaming process is not required. Therefore, it can not only save the subsequent rolling and defoaming processes, but also improve the yield rate of the touch-control display panel. Since the first adhesive 40 is the double-sided adhesive and cannot flow, after the capacitive film 20 is adhered to the first adhesive 40, the capacitive film can still be kept in a flat state, so that it can avoid the possible wrinkling of the capacitive film during the rolling process. Therefore, the flatness of the capacitive film 20 of the touch-control display panel manufactured by the method can be relatively high, so that it can further improve the yield rate of the touch-control display panel. More importantly, with a bonding force between the capacitive film 20 and the glass cover plate 10 and a bonding force between the capacitive film 20 and the display screen 30, it can be ensured to the greatest extent that the capacitive film 20 can still remain flat after bonding, which further improves the yield rate of the touch-control display panel. In addition, since the first adhesive 40 and the second adhesive 50 are only provided in the area corresponding to the non-display area, the adhesives do not need to be optical adhesives, and the ordinary adhesives that are non-transparent can be used. so that the manufacturing cost of the touch-control display panel can also be reduced.

In a second aspect, according to the bonding method, even if the product on the market need to be repaired, during reworking, the surrounding adhesive can be cleaned directly in a normal temperature environment, instead of a low temperature environment. The structure of the capacitive film is not easily damaged during the process of cleaning the adhesive. Therefore, the touch-control display panel manufactured by the bonding method of the present application can also be reworked and repaired, thereby reducing the maintenance cost of the product.

Furthermore, since the display screen 30 is thinner than the glass cover plate 10, if the capacitive film 20 is bonded to the display screen 30 firstly, the flatness of the capacitive film 20 may not be guaranteed. Therefore, in the present application, the capacitive film 20 is bonded to the glass cover plate 10 firstly, so that it can better improve the flatness of the capacitive film 20 and improve the quality and performance of the touch-control display panel.

In step S200, the capacitive film 20 is aligned with the glass cover plate 10. Specifically, alignment marks can be made on the capacitive film 20 and the glass cover plate 10 respectively, and the alignment can be performed through the alignment marks. In the case that the size of the capacitive film 20 is consistent with the size of the glass cover plate 10, the edge-and-corner alignment can also be adopted. Similarly, in step S400, the alignment between the display screen 30 and the capacitive film 20 can also adopt the above method, only need to replace the glass cover plate 10 with the display screen 30, which will not be repeated here.

In order to further increase the bonding reliability between the capacitive film 20 and the glass cover plate 10, between step S400 and step S600, the bonding method further includes:

S500: a pressing step: pressing the capacitive film 20 and the glass cover plate 10 to adhere the capacitive film 20 and the glass cover plate 10 firmly. In other words, after adhering the capacitive film 20 with the first adhesive 40, pressure is applied to the capacitive film 20 to make the bonding between the capacitive film 20 and the glass cover plate 10 more firm. Especially in the embodiment in which a through hole 21 is formed on the capacitive film 20 (described in detail below), according to this step, an adhesive layer of the first adhesive 40 can enter into the through hole 21, so as to contact and adhere with the second adhesive 50, thereby better improving the bonding reliability of the entire touch-control display panel; and according to this step, it is also possible to further reduce a gap between the capacitive film 20 and the glass cover plate 10 in a middle area, and improve the touch-control performance of the touch-control display panel. In the embodiment where the first adhesive 40 is discontinuously arranged, the gap between the capacitive film 20 and the glass cover plate 10 in a corresponding portion of the non-display area can be reduced to better prevent impurities such as dust from entering between the capacitive film 20 and the glass cover plate 10.

Specifically, the glass cover plate 10 can be pressed only on a portion of the capacitive film 20 corresponding to the first adhesive 40, or on several corner positions of the capacitive film 20, or on an entire surface of the capacitive film 20. In an optional embodiment of the present application, the glass cover plate 10 is pressed on the portion of the capacitive film 20 corresponding to the non-display area. That is, step S500 specifically includes:

placing a pressing plate on the side of the capacitive film 20 facing away from the glass cover plate 10 to align the pressing plate with the non-display area, in which the pressing plate is frame-shaped, so as to apply the pressure to the capacitive film 20 and the glass cover plate 10. An additional pressure can be applied to the pressing plate, or the gravity of the pressing plate itself can be used, so that the capacitive film 20 and the glass cover plate 10 closely adhere with the first adhesive 40.

In this way, the positions on the capacitive film 20 adhered with the first adhesive 40 can be fixed through the frame-shaped pressing plate. When a force is applied to this region, the flatness of the capacitive film 20 can be better ensured during the entire pressing process.

It should be noted that, during the pressing process, the stretching device may still maintain a stretching effect on the capacitive film 20. In an optional embodiment, after the capacitive film 20 is adhered to the first adhesive 40 (that is, after step S400), the stretching of the capacitive film 20 by the stretching device can be cancelled. During the pressing process, no stretching device is needed to stretch the capacitive film 20, so that the pressing operation can be facilitated.

The first adhesive 40 may be the double-sided adhesive with a smaller thickness. A double-sided adhesive tape provided by 3M manufacturer can be selected to reduce the thickness of the gap between the glass cover plate 10 and the capacitive film 20 as much as possible to improve the touch sensitivity. Specifically, the thickness of the first adhesive can be selected from 0.5 mm to 3 mm, such as 0.5 mm, 0.6 mm, 0.8 mm, 1.0 mm, 1.2 mm, 1.5 mm, 1.8 mm, 2.0 mm, 2.4 mm, 2.6 mm, 2.8 mm, 3.0 mm and the like. Thus, the display area of the glass cover plate 10 cannot be bonded with the capacitive film 20, and a thinner air gap can be formed, which can be beneficial to improve the touch sensitivity. In the embodiment where the first adhesive 40 is discontinuously arranged (described in detail below), the thinner double-sided adhesive tape, especially the double-sided adhesive tape with the thickness in the above range, is selected, so that it can also reduce a distance between the glass cover plate 10 and the capacitive film 20, thereby better preventing impurities such as dust from entering between the glass cover plate 10 and the capacitive film 20. Specifically, the thickness of the first adhesive 40 can be selected according to a touch-control distance and the thickness of the glass cover plate 10. For example, in an embodiment where the touch-control distance of the capacitive film 20 is not higher than 4.5 mm and the thickness of the glass cover plate 10 is 2 mm, the thickness of an air layer between the capacitive film 20 and the glass cover plate 10 is required to be less than or equal to 2.5 mm. Of course, the thinner the thickness of the air layer is, the better the touch-control effect is.

The second adhesive 50 may be the liquid adhesive, that is, the second adhesive has the certain fluidity. In the case that the liquid adhesive is selected, due to the poor controllability of the liquid adhesive, the adhesive overflow may occur during the process of bonding the display panel 30, and the liquid adhesive may even flow to the display area; after adhering, it is necessary to clean up the excess adhesive so that it may increase the cleaning process; in addition, once the liquid adhesive is used, the curing process will be increased, which will increase the assembly time of the touch-control display panel. In an optional embodiment of the present application, the second adhesive 50 may be the same as the first adhesive 40 and both are double-sided adhesive. Specifically, the double-sided adhesive can refer to the above description. In this way, the operation can be facilitated, and the curing process and an adhesive-cleaning process can be saved. More importantly, the adhesive will not flow to the display area, which can further improves the yield rate of the touch-control display panel.

Optionally, no matter what kind of adhesive is selected for the second adhesive 50, the thickness of the second adhesive 50 may be 1 mm to 5 mm, such as 1 mm, 1.2 mm, 1.5 mm, 1.8 mm, 2.0 mm, 2.3 mm, 2.5 mm, 2.8 mm, 3 mm, 3.5 mm, 3.8 mm, 4.2 mm, 4.5 mm, 4.7 mm, 5 mm and the like. The thickness of the second adhesive 50 is in this range, so that it can reduce the thickness of an air gap between the display panel 30 and the capacitive film 20 as much as possible, reduce the loss of light and improve the display effect. In this thickness range, it can prevent contact and bonding between the capacitive film 20 and the display panel 30 and further improve the display effect. The thicknesses of the first adhesive 40 and the second adhesive 50 can be selected to be the same, especially when the second adhesive 50 is also the double-sided adhesive as the first adhesive is, so that it can be easy to select the material and can reduce the manufacturing cost.

In an optional embodiment, the first adhesive 40 is discontinuously arranged. That is, in the primary adhesive-applying step, the first adhesive 40 is discontinuously arranged in the circumferential direction of the non-display area, thus the first adhesive 40 in the formed touch-control display panel is discontinuously arranged in the circumferential direction of the non-display area. In other words, in the entire circumferential direction, the first adhesive 40 may be divided into a plurality of sub-sections with a distance between each two sub-sections, and the sub-sections are arranged in the circumferential direction of the non-display area. Thus, positions of the capacitive film 20 in the entire circumferential direction are not directly subjected to an adhesive force, so that the capacitive film 20 can better maintain flatness. Specifically, an extending direction of each sub-section can be in a strip shape, or in other shapes. When in the strip shape, it may extend in the circumferential direction of the non-display area. For example, when the glass cover plate 10 is the rectangular plate, the sub-section may extend along the long side or the short side, or form a certain angle with the circumferential direction of the non-display area. Certainly, the first adhesive 40 can also be arranged in the entire circumferential direction of the non-display area, that is, the first adhesive 40 is arranged in a ring shape, so as to improve the sealing between the glass cover plate 10 and the capacitive film 20.

The second adhesive 50 may be also discontinuously arranged in the circumferential direction of the non-display area. The present application considers that the capacitive film 20 is very flat by the bonding between the capacitive film 20 and the glass cover plate 10, especially after the pressing step, the flatness of the capacitive film is already very high, and the display screen 30 is relatively thin; in order to increase the reliability of the display screen 30 bonding with the capacitive film 20, in the second adhere-applying step, the second adhesive 50 is arranged in a ring shape; in other words, the second adhesive 50 is arranged in the entire circumferential direction of the non-display area, thereby forming a closed ring structure, that is, in the formed touch-control display panel, the second adhesive 50 is in the ring shape to improve the sealing between the capacitive film 20 and the display screen 30.

In another optional embodiment of the present application, before the capacitive film bonding step as described above, the bonding method further includes:

S100: a hole-forming step: forming a through hole 21 on a portion of the capacitive film 20 corresponding to the non-display area to form the capacitive film 20 with the through hole 21. As shown in FIG. 4, after such arrangement, the first adhesive 40 and the second adhesive 50 can be adhered with each other through the through hole 21 in subsequent steps, and finally form the touch-control display panel as shown in FIG. 3. Thus, the capacitive film 20 can be kept more flat under the effect of the bonding force between the capacitive film 20 and the glass cover plate 10, the bonding force between the capacitive film 20 and the display screen 30 and the bonding force between the glass cover plate 10 and the display screen 30 directly through the through hole 21, and the bonding reliability can be higher. Even if the capacitive film 20 is detached from the first adhesive 40 and the second adhesive 50 at both sides of the capacitive film, the first adhesive 40 and the second adhesive 50 located at the through hole 21 can also ensure that the capacitive film is bonded with the glass cover plate 10 and the display screen 30.

The shape of the through hole 21 is not limited, and may be a round hole, a strip-shaped hole, an elliptical hole or the like. The through hole 21 may be a larger hole in the circumference of the non-display area. Optionally, there are a plurality of through holes 21 evenly distributed in the circumferential direction of the non-display area. In the embodiment where the capacitive film 20 is a rectangular film, the through holes 21 are formed on the four corner positions, the long edges and the short edges except the corner positions of the capacitive film 20, so as to increase the positions where the glass cover plate 10 and the display screen 30 are directly adhered, and to increase the bonding reliability among the capacitive film 20, the glass cover plate 10 and the display screen 30.

Furthermore, as shown in FIG. 4, the round through holes 21 may be formed at four corner positions of the capacitive film 20; the elliptical holes or strip-shaped holes may be formed on the long edges except for the corner positions, and the long axes of the elliptical holes and the length directions of the strip-shaped holes are consistent with the extending direction of the long edges; the round holes may be formed on the short edges except for the corner positions. After such arrangement, the flatness of the capacitive film 20 can be further ensured, the reliability of the connection of various components of the touch-control display panel can be increased, and the yield rate of the touch-control display panel can be improved.

It should be noted that, in the above bonding method, steps S100-S600 do not fully limit the order in which they are executed, as long as steps S200, S400, S500, S600 and S800 are executed in sequence, and step S100 is executed before step S400.

In addition, the present application also provides a touch-control display panel, which can be manufactured by the bonding method in any one of the above-described embodiments.

As shown in FIGS. 2-4, the touch-control display panel includes the glass cover plate 10, the capacitive film 20, and the display screen 30 arranged in sequence, and the through hole 21 is formed on the capacitive film 20 corresponding to the non-display area. The touch-control display panel further includes the first adhesive 40 and the second adhesive 50, the first adhesive 40 is arranged between the glass cover plate 10 and the capacitive film 20, the second adhesive 50 is arranged between the capacitive film 20 and the display screen 30, and both the first adhesive 40 and the second adhesive 50 are arranged in the circumference of the non-display area of the glass cover plate 10. In other words, the first adhesive 40 can be arranged between the glass cover plate 10 and the capacitive film 20 in the circumferential direction of the non-display area, so as to adhere the glass cover plate 10 and the capacitive film 20 together; the second adhesive 50 can be arranged between the capacitive film 20 and the display screen 30 in the circumferential direction of the non-display area, so as to adhere the capacitive film 20 and the display screen 30 together; and the first adhesive 40 and the second adhesive 50 are adhered with each other through the through holes. At this time, the air layers are formed between the glass cover plate 10 and the capacitive film 20 and between the capacitive film 20 and the display screen 30 respectively in the area corresponding to the display area of the glass cover plate 10. At least the first adhesive 40 is the double-sided adhesive. The touch-control display panel has the beneficial effects described above in the manufacture and use, which will not be repeated here.

The selection and arrangement of the first adhesive 40 and the second adhesive 50 can adopt any one of the above embodiments. In an optional embodiment of the present application, the first adhesive 40 can be discontinuously arranged in the circumferential direction of the non-display area; the second adhesive 50 can be arranged in the ring shape, so as to not only increase the flatness of the capacitive film 20 after forming, but also improve the reliability of the connection among the components of the entire touch-control display panel, thereby improving the yield rate of the entire touch-control display panel.

The specific structure of the capacitive film 20 has been described in the above bonding method, and will not be repeated here.

In an optional embodiment of the present application, the second adhesive 50 may be the double-sided adhesive; the thickness of the first adhesive 40 may be 0.5 mm-3 mm; the thickness of the second adhesive 50 may be 1 mm-5 mm. Since the second adhesive 50 and the first adhesive 40 in the present embodiment have been described in the above bonding method, the details will not be repeated here.

The present application provides an electronic device including the touch-control display panel as described above. The examples of the electronic device includes an interactive display screen, an interactive smart panel, a flat panel TV and the like.

Those skilled in the art should understand that, on the premise of no conflict, the above optional solutions can be freely combined and superimposed.

It should be understood that the above-described embodiments are only exemplary rather than restrictive. Without departing from the basic principle of the application, various obvious or equivalent modifications or replacements that can be made by those skilled in the art with respect to the above details will be included in the scope of the claims of the present application.

What is claimed is:

1. A bonding method of a touch-control display panel, the touch-control display panel comprising a glass cover plate, a capacitive film and a display screen, the bonding method comprising:
   a primary adhesive-applying step: fixing the glass cover plate, and adhering a first adhesive on the glass cover plate in a circumferential direction of a non-display area of the glass cover plate;
   a capacitive film bonding step: stretching the capacitive film to make it flat, aligning and bonding the capacitive film with the glass cover plate to adhesive the capacitive film and the glass cover plate by the first adhesive;
   a secondary adhesive-applying step: at a side of the capacitive film facing away from the glass cover plate, adhering a second adhesive on the capacitive film in the circumferential direction corresponding to the non-display area; and
   a display screen bonding step: aligning and bonding the display screen with the capacitive film to adhesive the display screen and the capacitive film by the second adhesive, thereby forming air gaps between the glass cover plate and the capacitive film and between the capacitive film and the display screen respectively in an area corresponding to a display area of the glass cover plate;
   wherein at least the first adhesive is a double-sided adhesive.

2. The bonding method according to claim 1, between the capacitive film bonding step and the secondary adhesive-applying step, the bonding method further comprising:
   a pressing step: pressing the capacitive film and the glass cover plate to adhere the capacitive film and the glass cover plate firmly.

3. The bonding method according to claim 2, wherein the pressing step specifically comprises:
   placing a pressing plate on the side of the capacitive film facing away from the glass cover plate, wherein the pressing plate is frame-shaped, the pressing plate corresponds to the non-display area, thereby applying a pressure to the capacitive film and the glass cover plate, so that the capacitive film and the glass cover plate closely adhere with the first adhesive.

4. The bonding method according to claim 2, wherein before the capacitive film bonding step, the bonding method further comprises:
   a hole-forming step: forming a through hole on a portion of the capacitive film corresponding to the non-display area, so that in the pressing step, an adhesive layer of the first adhesive enters into the through hole.

5. The bonding method according to claim 4, wherein a plurality of through holes are evenly distributed in the circumferential direction of the non-display area.

6. The bonding method according to claim 1, wherein in the primary adhesive-applying step, the first adhesive is discontinuously arranged in the circumferential direction of the non-display area.

7. The bonding method according to claim 1, wherein the second adhesive is a double-sided adhesive, and in the secondary adhesive-applying step, the second adhesive is arranged in a ring shape.

8. The bonding method according to claim 1, wherein before the capacitive film bonding step, the bonding method further comprises:
   a hole-forming step: forming a through hole on a portion of the capacitive film corresponding to the non-display area, so that in the display screen bonding step, the first adhesive and the second adhesive are enabled to be adhered with each other through the through hole.

9. The bonding method according to claim 8, wherein a plurality of through holes are evenly distributed in the circumferential direction of the non-display area.

10. A touch-control display panel, comprising a glass cover plate, a capacitive film and a display screen arranged in sequence, wherein a through hole is formed on an area of the capacitive film corresponding to a non-display area of the glass cover plate;
    the touch-control display panel further comprises:
    a first adhesive, arranged between the glass cover plate and the capacitive film; and
    a second adhesive, arranged between the capacitive film and the display screen;
    wherein each of the first adhesive and the second adhesive is arranged in a circumferential direction of the non-display area of the glass cover plate; the first adhesive and the second adhesive are adhered to each other through the through hole, so that air layers are formed between the glass cover plate and the capacitive film and between the capacitive film and the display screen respectively in an area corresponding to a display area of the glass cover plate;
    wherein at least the first adhesive is a double-sided adhesive.

11. The touch-control display panel according to claim 10, wherein the first adhesive is discontinuously arranged in the circumferential direction of the non-display area; the second adhesive is arranged in a ring shape.

12. The touch-control display panel according to claim 10, wherein the second adhesive is a double-sided adhesive; a thickness of the first adhesive is 0.5 mm-3 mm; a thickness of the second adhesive is 1 mm-5 mm.

13. The touch-control display panel according to claim 10, wherein a plurality of through holes are evenly distributed in the circumferential direction of the non-display area.

14. An electronic device, comprising the touch-control display panel according to claim 10.

15. The electronic device according to claim 14, wherein the electronic device is an interactive display screen, an interactive smart panel or a flat panel TV.

16. The electronic device according to claim 14, wherein the first adhesive is discontinuously arranged in the circumferential direction of the non-display area; the second adhesive is arranged in a ring shape.

17. The electronic device according to claim 14, wherein the second adhesive is a double-sided adhesive; a thickness of the first adhesive is 0.5 mm-3 mm; a thickness of the second adhesive is 1 mm-5 mm.

* * * * *